United States Patent Office 2,922,810
Patented Jan. 26, 1960

2,922,810

CHLOROMETHANEPHOSPHONIC ACID ESTERS

Arthur Dock Fon Toy, Park Forest, and Kenneth H. Rattenbury, Chicago Heights, Ill., assignors to Victor Chemical Works, a corporation of Illinois No Drawing. Application July 13, 1953
Serial No. 367,732

5 Claims. (Cl. 260—461)

This invention relates to new diesters of monochloromethanephosphonic acid.

The esters contemplated in this invention may be illustrated by the following formula:

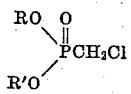

in which R is either paranitrophenyl

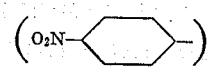

or parachlorophenyl

and R' may be the same as R or in addition may be a lower alkyl group such as methyl, ethyl, propyl or butyl. Thus specific esters covered by the present invention may be the di(parachlorophenyl), di(paranitrophenyl), methyl paranitrophenyl, ethyl paranitrophenyl, propyl paranitrophenyl, butyl paranitrophenyl, and ethyl parachlorophenyl esters of chloromethanephosphonic acid, and similar esters are designated broadly by the above formula.

These esters may be made by the known process of reacting approximately stoichiometric quantities of the desired alcohol or substituted phenol with monochloromethanephosphonic dichloride according to the following equations:

(1) 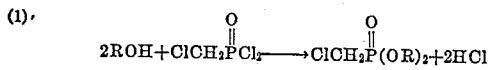

in the case of the diester or (2) 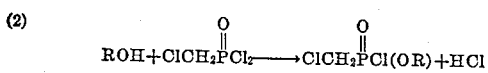

(3) 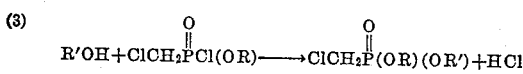

in the case of the mixed ester where R and R' are as defined above. Alkali metal phenolates or alcoholates may be substituted for the alcohols and phenols in the above equation without altering the results of the reactions. In some cases it is desirable to conduct the reactions in the presence of a tertiary amine to act as an hydrogen chloride acceptor.

The chloromethanephosphonic dichloride shown in the above equations may be made by the known process of reacting phosphorus trichloride and formaldehyde under suitable conditions of temperature and pressure. The distilled product resulting from this reaction is the preferred material. The alcohols and phenols, or in some cases the alcoholates or phenolates, may be the normal products of commerce. In the case of sodium paranitrophenolate the dihydrate is the usual product in which case it must be dehydrated before use. One satisfactory method of preparing the anhydrous compound is illustrated in Example 1.

The following examples show the method by which the esters of this invention may be prepared.

Example 1.—Ethyl paranitrophenyl chloromethanephosphonate was prepared as follows. 49.1 gms. (0.25 mole) of sodium paranitrophenolate dihydrate and 240 cc. of chlorobenzene were placed in a 500 cc. flask equipped with a condenser, condensate separator and return line. The mixture was heated to reflux temperature and the water of hydration was then removed by azeotropic distillation. 100 cc. of the chlorobenzene was then removed by distillation. The remaining solution was cooled to 25° C. and 44.2 gms. (0.25 mole) of ethyl monochloromethanechlorophosphonate were added dropwise with stirring while maintaining the temperature between 25–30° C. The addition took 35 minutes following which the product was stirred at 25° C. for one hour. It was then heated to 70° C. for 45 minutes, cooled to 15° C., and transferred to a separatory funnel. It was washed successively with 200 cc. of ice water, 200 cc. of 2% NaOH solution and three more 200 cc. portions of ice water. It was then transferred to a 300 cc. distilling flask where the solvent was removed at 50° C. under reduced pressure. All volatiles were then removed by heating to 100° C. at 1 mm. of mercury pressure. It was cooled and filtered to give 45.1 gms. (63%) of the ethyl paranitrophenyl chloromethanephosphonate product having an index of refraction $N_D^{25}=1.5412$. The analysis showed:

| | Calculated, percent |
|---|---|
| P=11.1% | 11.1 |
| Cl=12.6% | 12.7 |

The ethyl monochloromethanechlorophosphonate used in the above example was prepared by reacting molar quantities of monochloromethane phosphonic dichloride and ethyl alcohol in the presence of one mole of triethylamine. A yield of 93.5% of ethyl monochloromethanechlorophosphonate resulted, having an index of refraction $N_D^{25}=1.4659$.

Example 2.—Di(parachlorophenyl) chloromethanephosphonate was prepared as follows. 167.5 gms. (1 mole) of chloromethanephosphonic dichloride was placed in a 500 cc. flask equipped with a reflux condenser protected from atmospheric moisture with a drying tube. 287.8 gms. (2 moles plus 11.2% excess) of parachlorophenol was then added. The flask was heated and at 90° C. HCl began to evolve. The reaction was completed by heating at above 200° C. for 17.7 hours. The product was made neutral to methyl orange by washing with a 10% solution of NaOH and then washed with water and a 2% NaCl solution. It was transferred to a distillation flask where volatiles were removed by heating to 100° C. at a pressure of 1 mm. The di(parachlorophenyl) chloromethanephosphonate product weighed 280 gms. (80%) had an index of refraction $N_D^{25}=1.5718$, and analyzed 9.1% phosphorus, 30.1% chlorine (theoretical 8.8 and 30.2% respectively). The liquid crystallized upon standing and was found after recrystallization to have a melting point of 58–59° C.

It has been found that the products of this invention possess excellent herbicidal qualities. This is in sharp contrast to what might be expected from the prior art. In many instances similar organic phosphorus compounds possess insecticidal qualities as illustrated by diethyl paranitrophenyl thiophosphate (Parathion) and ethyl paranitrophenyl benzenephosphonate (EPN). It is also known that in the case of some of the systemic organic phosphorus insecticidal compounds a fertilizing effect is actually produced when the plants metabolize the insecticide. Thus it was totally unexpected when the products of this invention were found to injure plant seeds to the extent that they become valuable as herbicides. This herbicidal action is illustrated in the following examples.

*Example 3.*—The herbicidal qualities of ethyl paranitrophenyl chloromethanephosphonate were tested by means of germination tests as follows. The compound was added to a waxed paper cup containing a solvent and water. A small float was adde which was covered with cheese cloth. The seeds to be tested (radish, cucumber, and wheat) were soaked two minutes in mercuric chloride solution, rinsed thoroughly and placed on the cheese cloth. The tip of alligator weed was soaked ½ hour in a solution of 10 p.p.m. alphanaphthalene acetic acid and added to the cup. This cup was then placed in a covered Pyrex dish and stored in a humidity room overnight. It was then removed and left under light for five days. Results are compared as follows:

0 = no germination
1 = slight germination
2 = fair germination
3 = good germination All four seeds gave a rating of zero.

*Example 4.*—An identical test was run in which the herbicidal qualities of di(parachlorophenyl) chloromethanephosphonate were tested. The germination tests showed the following results:

Wheat = 3
Radish = 3
Cucumber = 0
Alligator weed = 1

This indicates the more specific action of this compound as contrasted to the general herbicidal qualities shown by Example 3.

Having described our invention as related to the embodiments set out herein, it is our intention that the invention be not limited by any of the details of description unless otherwise specified, but rather be construed broadly within its spirit and scope as set out in the accompanying claims.

We claim:

1. A diester of monochloromethanephosphonic acid having the formula

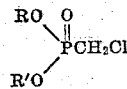

wherein R is a member of the class consisting of parachlorophenyl and paranitrophenyl and R' is a member of the class consisting of paranitrophenyl and lower alkyl radicals.

2. The new compound, methyl paranitrophenyl monochloromethanephosphonate.

3. The new compound, ethyl paranitrophenyl monochloromethanephosphonate.

4. The new compound, propyl paranitrophenyl monochloromethanephosphonate.

5. The new compound, butyl paranitrophenyl monochloromethanephosphonate.

References Cited in the file of this patent

UNITED STATES PATENTS 2,668,845   Tolkmith _____ Feb. 9, 1954

OTHER REFERENCES

Chem. Abst., vol. 45, p. 6570 (1951).